United States Patent [19]

Stoll

[11] Patent Number: 4,530,618

[45] Date of Patent: Jul. 23, 1985

[54] PLUG CONNECTION SYSTEM

[76] Inventor: Kurt Stoll, Lenzhalde 72, 7300 Esslingen, Fed. Rep. of Germany

[21] Appl. No.: 474,065

[22] Filed: Mar. 10, 1983

[30] Foreign Application Priority Data

Mar. 13, 1982 [DE] Fed. Rep. of Germany ....... 3209257
Dec. 13, 1982 [DE] Fed. Rep. of Germany ....... 3246042

[51] Int. Cl.³ .............................................. F16B 21/00
[52] U.S. Cl. ..................................... 403/322; 24/642;
403/407; 411/337
[58] Field of Search ................. 24/292, 297, 598, 642;
411/337, 347, 352, 353; 279/50, 57, 43;
403/407, 405, 321, 322, DIG. 4; 339/74 R, 217
S; 292/19, 170

[56] References Cited

U.S. PATENT DOCUMENTS

| 93,112 | 7/1869 | Mosher | 292/170 |
| 1,965,789 | 7/1934 | Anglyn | 292/170 X |
| 2,195,555 | 4/1940 | Beardsley | 279/50 |
| 3,569,903 | 3/1971 | Brishka | 339/74 R |
| 3,717,838 | 2/1973 | Halbeck | 339/74 R |
| 3,721,945 | 3/1973 | Hults | 339/74 R |
| 3,808,590 | 4/1974 | Hemmer et al. | 339/217 S |

Primary Examiner—David H. Corbin
Attorney, Agent, or Firm—Flynn, Thiel, Boutell & Tanis

[57] ABSTRACT

For temporarily fixing circuit elements to a panel pins are used whose thickened inner ends are gripped by jaws behind the panel. There are sliding sleeves on the pins that may be used for pushing the gripping jaws clear of the pins so that thickened inner ends of the pins may be pulled past the jaws and the pins pulled out clear of the panel.

15 Claims, 10 Drawing Figures

PLUG CONNECTION SYSTEM

FIELD OF THE INVENTION

The present invention relates to a connection system for fastening structures temporarily to a panel or board using at least one pin, as for example for the purpose of fixing pneumatic, hydraulic, electrical or other components to a panel for making up circuits of such components for purposes of training and education. More specially, such a panel and the components may be in the form of a kit for training purposes. Such a panel has openings for fastening elements, that is to say for at least one pin, so that the components may be fixed temporarily to the panel.

BACKGROUND OF THE INVENTION

Connection or fastening systems of the sort noted have turned out to be of value when it is a question of quickly producing connections, that are, generally speaking, only acted on by static forces between the components and the panel in such a way that the components may be quickly taken down from the panel again when necessary. The most common sort of fastening device using a pin-like element is one in which a hole is made through the two elements to be joined together with the same hole diameter in the two elements and then a pin or rod is placed through the two holes so that one end part of the pin or the like is seated in one element and the other end part thereof is seated in the other member or element. Such a fastening device based on the use of a pin is more specially of value when the two joined elements are not to be moved in relation to each other. However, when it is a question of parts that may be moved in relation to each other, as for example when one part is turned in relation to the other or the parts are acted upon by dynamic forces, these known fastening systems are of less use, because there is a chance of their working loose. It is more specially for training and demonstration purposes for trainees in engineering and in fields having to do with pneumatic, hydraulic, electronic or fluidic systems that such kits may well be used to make clear the function of the different parts of such systems under true working conditions. Such a training kit will normally be made up of a panel with openings therein into which the parts may be plugged, that is to say a panel or board with holes therein to take up the pins, and the elements or components that may be joined together by lines (i.e. wires or pipes) and thus connected in a circuit with each other. It is more specially when the components to be joined together are fluidic, pneumatic or hydraulic components that the plug-in connections are likely to be heavily loaded, because of the high pressures or high surge pressures that are to be experienced even when the use is only for training purposes.

SUMMARY OF THE PRESENT INVENTION

One purpose of the present invention is that of designing a connection system of the sort noted that has a long working life and is trouble-free in use even when acted upon by vibrations and other strong dynamic forces, and for this reason is of value for use with known plug-in panels as parts or training kits.

A further purpose of the invention is that of designing a connection of this sort that may readily be undone and done up while nevertheless being of such a nature that there is no chance of its coming undone by itself.

One still further purpose of the present invention is that of designing such a connection or coupling that may be produced at a low price.

One even further purpose of the present innovation is to have a connection device whose parts when worn may readily be taken off it and new ones put in their place.

For effecting these and other purposes in the invention the connection has a sleeve that may be axially moved on the pin and the pin together with the sleeve may be plugged into a bush designed to be locked into an opening in the panel, and the pin is locked in position in the bush by gripping jaws on the bush which are controlled by the sleeve.

Further useful developments of the invention will be seen in the account now to be given of working examples thereof as based on the accompanying figures, and the claims.

BRIEF DESCRIPTION OF THE DRAWINGS

Lastly

DETAILED DESCRIPTION

Figure 1:
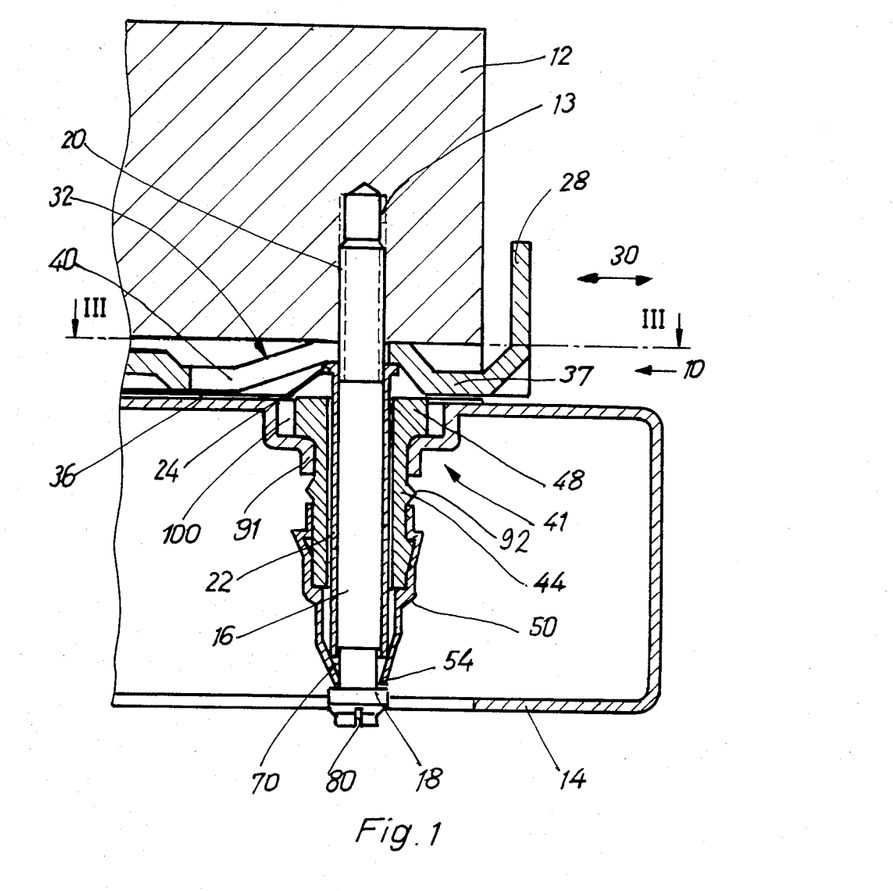
FIG. 1 is an axial or lengthways section through a connector for joining a component to a panel, in the locked condition.

Turning now first to FIG. 1 it will be seen that it is a view of a connector generally numbered 10. The purpose of the connector is producing a connection temporarily between a pin 16 and a panel 14 by fixing the pin 16 into an opening 100 in the panel 14. The outcome is a connection joining a component 12 to the panel 14. The component has a threaded hole 13, into which the threaded end 20 of the pin 16 is screwed. The other end of the pin 16 is plugged into the panel 14 so as to make the connection between the component 12 and the panel 14.

A cylindrical sleeve 22 is placed round the pin 16 and it may be readily moved axially on the pin 16. The pin 16 with the sleeve 22 is taken up in a bush 44, which is locked into the opening 100 of the panel 14. The bush 44 has gripping or locking jaws or elements 54 for locking the pin 16 in the locked position as seen in FIG. 1. In this locked position of the connector, the pin 16 is locked by the gripping jaws 54 so that it may not be pulled out of the plug 44.

This locking effect is produced by the gripping jaws acting on a hear or collar 18, that is placed on the end, into the panel 14, of the pin 16.

The diameter of the collar 18 is greater than the inner diameter of the said sleeve 22 so that in the first place its purpose is that of limiting axial motion of the sleeve 22 on the pin 16. As may be seen from FIG. 1, however, the sleeve 22 is not, in the locking condition, moved as far as the collar 18 down the pin 16 but has some axial spacing between it and the collar 18, this making it possible for the gripping jaws 54 to be in a position engaging the pin 16 between the sleeve 22 and the collar 18. In this position the jaws are not opened up, that is to say they are shut as far as possible. The diameter of the collar 18 is of such a size that it may not be slipped through between the shut gripping jaws 54. In fact, if any attempt is made at pulling the pin out of the bush 44 the jaws 54 will come up against the collar 18 so that the pin 16 may not be pulled out of the bush 44.

As the reader will see from FIG. 1, the sleeve 22 is so placed that part of its length is outside the panel 14 and it is possible, using the sleeve 22, for the gripping jaws 54 to be opened out clear of the collar 18 and thus freeing the pin 16. To this end the sleeve 22 is moved down on the pin 16 axially till its end comes up against the collar 18. In the unlocked condition the gripping jaws 54 are opened and moved clear of the pin 16 by the sleeve 22 through radially outward movement. The collar 18 and the sleeve 22 are made with such a size that the outer diameter of the collar 18 is not greater than the outer diameter of the sleeve 22 and the collar 18 may be moved through the opened-up gripping jaws 54 so that in the unlocked condition the pin 16 together with the sleeve 22 may be pulled out of the bush 44.

The unlocking motion of the sleeve 22 responsible for freeing the pin 16 is preferably produced by a slide 28 which serves as an operating element. Using the slide 28 the sleeve 22 is changed over from the position to be seen in FIG. 1 into the position seen in FIG. 2. The slide 28 is placed between the component 12 to be fixed in position and the panel 14 so that it (the slide) may be moved in a direction at right angles to the pin 16. Looking firstly at the design of the parts as presented in FIGS. 1 to 3, it will be seen that there is a lengthways slot 40 in the slide 28, such slot 40 making it possible for the pin 16 to extend through the slide and for the slide to be moved in relation to the pin 16. For at least part of its length the slide 28 has a cam slope 32 that is at an angle in relation to the pin 16. The effect of this cam slope 32 is such that when the slide 28 is moved at a right angle in relation to the pin 16 such motion is changed into an axial motion of the sleeve 22 on the pin 16. In this connection the sleeve 22 will be seen to have a collar 24 at its end sticking out of the panel 14. As part of a preferred working example of the invention the cam slope 32 is joined up at its two ends with flat shoulders 36 and 38 to keep the collar 24 on the sleeve 22 in the locked position and in the other case in the unlocked position. In this respect the shoulders 36 and 38 are vertically out of line with each other by an amount that is the same as the distance of the sleeve 22 from the collar 18 of the pin 16 in the unlocked condition.

This system of parts makes it possible for a pin 16 to be temporarily locked in panel 14, for the purpose of fixing many different sorts of components 12 to the panel 14. An account will now be given of how this is done. Firstly the bush 44 is inserted into an opening 100 made for it in the panel 14, the bush snapping into place in a way of which further details will be given hereinafter. The bush 44 is kept permanently in the opening 100 and is not normally taken out every time the pin 16 is taken out of the panel 14. When the bush 44 has been placed in the opening, the panel is ready for the pin 16 to be put in place. The sleeve 22 is slipped onto the pin 16 with the collarless end first so that this end comes up against the collar 18, the last-named limiting the depth to which the sleeve 22 may be moved along the pin 16. Nextly the slide 28 is placed on the pin 16 over the sleeve 22, that is to say the pin 16 is run through the slot 40 in the slide 28. The threaded end 20 of the pin 16 with the sleeve 22 and the slide 28 put on it in this way is then screwed into the threaded hole 13 in the component 12 so that the sleeve 22 and the slide 28 are fixed between the component 12 and the collar 18 and may be moved to a limited degree freely on the pin 16.

The pin 16 with the collar 18 to the front is now slipped into the bush 44, the collar 18 then running up against the gripping jaws 54 which in their freed position having an opening between them that is smaller than the size of the collar 18. On pushing in the pin 16 the gripping jaws 54 are opened out radially by the collar 18 and the elastic material of which they are made is stressed. An important point in connection with the function of the plug-in connector of the present invention is that the friction between the sleeve 22 and the bush 44 be greater than the friction between the sleeve 22 and the pin 16. On pushing the pin 16 together with the sleeve 22 thereon into the bush 44 the sleeve will, because of such friction, be kept back and not moved as far as the pin 16, that is to say, the pin 16 is moved axially in relation to the sleeve 22. The sleeve 22 is however moved along by the slide, which for this purpose is moved into the locking position to be seen in FIG. 1. The slide 28 is used as a spacer or distance piece limiting the degree to which the component is moved towards the panel 14 as the pin 16 is pushed home. The end position of the parts after pushing home the pin will be the locking position as marked in FIG. 1, in which slide 28 rests against the panel 14 on the one side and further rests against the component 12 on the other side. The sleeve 22 as well is moved by the slide 28, thus keeping up with the inward motion of the pin 16. The inward force necessary in this respect is produced by the shoulder 38 of the slide 28 acting on the collar 24 of the sleeve 22. The slide 28 is of such a form that the shoulder 38 in the end position of FIG. 1, is at some distance from the panel 14. The inward motion of the sleeve 22 is for this reason at first not completed. The sleeve 22 has, in the locked position, a part of its length sticking out of the bush 44 while at the same time its other end is a corresponding distance from the collar 18 of the pin 16. The gripping jaws 54 moved out of position by the collar 18 may for this reason be moved back by the elasticity of their material after the collar 18 has been moved through between them and come into a position between the collar 18 and the sleeve 22 on the pin 16. In this position the pin 16 is locked by the gripping jaws 54 and may be pulled out of the bush 44.

Because of the amounts of friction as noted and the relation therebetween inside the bush 44 it will be seen that it is possible for the component 12 to be fixed in position on the panel 14 by a simple motion of the pin 16 with the slide 28 and the sleeve 22 thereon. If the component 12 is now to be taken down from the panel again, the slide 28 is moved back out of the locked position to be seen in FIG. 1 into the unlocked position seen in FIG. 2 to the left (see arrow 30). The collar 24 on the sleeve 22 is in this case moved along by the cam slope 32 or ramp and the sleeve 22 is forced into the bush 44 until it comes up against the collar 18 of the pin 16. When this is done the gripping jaws 54 are opened up radially outwards by the sleeve 22 so that the collar 18 may be slipped through between the said jaws 54. It is for this reason possible for the component 12 with all parts joined thereto of the connector to be pulled out clear from the bush 44.

To give a general picture it may be said that the main points of the design of the connection are:

(a) The fastening device made up of the pin 16, a bush 44 designed to be fitted into the opening 100 in a panel 14, the bush 44, system having stop elements as for example jaws 54, a cylindrical sleeve 22 placed between the pin 16 and the bush 44, and a slide 28 that may be moved between a locked position and an unlocked position of the fastening device;

(b) on the pin 16, whose end nearest the panel has a collar 18, the sleeve 22 is placed, so that it may be freely run along the pin 16, the end of the sleeve furthest from the collar 18 of the pin 16 having a collar 24, the diameter of the collar 18 on the pin 16 being greater than the inner diameter of said sleeve 22 without however being greater than the outer diameter of the sleeve 22, while on the other hand the slide 28 which cooperates with the collar 24 of the sleeve 22 is placed so that it may be moved normally to the pin 16, and in the unlocked position the collarless end of the sleeve 22 is engaging the end face, or annular shoulder facing the sleeve 22, of the collar 18 on the pin 16 and in the locked position the collarless end of the sleeve 22 being at a distance from the collar 18 of the pin 16;

(c) the sleeve 22 may be moved along in the bush 44, whose inner diameter is smaller that the diameter of the collar 24 of the sleeve 22 and whose axial length is about the same as the length of the collarless part of the sleeve 22, and in the locked condition of the fastening device or connector 10 the locking elements are on the side, facing the collar 18 of the pin 16, of the bush 44 between the sleeve 22 and the collar 18 on the pin 16; and (d) the locking elements at the end of the bush 44 have, in the freed condition, an inner diameter that is smaller than the outer diameter of the collar 18 on the pin 16.

An account will now be given of certain details of the invention starting with the slide 28. A first working example of such a slide will be seen in the FIGS. 1 to 3. The slide 28 to be seen here has the form of a bar with a number of low bends therein. It has the slot 40 so that the pin 16 may be inserted through it. The slide 28 may be moved in the direction of its length (arrow 30) between the panel 14 and the component 12, the right hand end of the slide 28 sticking out from between these two parts so that this end may be used as a handle for moving the slide 28 along. The sleeve 22 is moved by a cam slope 32, that is to say, an inclined plane at an angle in relation to the pin 16. The bent form of the slide makes it possible for the inclined plane oriented to be formed by the lower face of the slide 28 itself. The inclined plane on the cam slope is joined up at its ends with shoulders 36 and 38 that are parallel to the outer face of the panel 14. As the reader will more specially see from FIG. 3, the length of the slot 40 is such that the slot goes all the way along the length of the inclined plane formed by the cam slope 32 and part of each of the shoulders 36 and 38. The slide 28 may be moved between a locking position of the fastening device 10, in which the pin 16 rests on the shoulder 38 (see FIGS. 1 and 3), and an unlocked position (see FIG. 2), in which the inner end of the pin 16 is pushed in as far as the shoulder 36. As will more specially be seen in FIG. 3, the breadth of the slot 40 is such that the pin 16 but not the collar 24 of the sleeve 22 may be moved through it. This being the case, if the slide 28 is moved in the way noted, the collar 24 will be moved, along the inclined plane of the cam slope 32 so that the sleeve 22 will be forced into the bush 44. The end positions of the sleeve 22 are in this respect represented by the underfaces of the shoulders 36 and 38 that have a difference in level between them equal to the distance of the sleeve 22 from the collar 18 of the pin 16 in its unlocked position. The collar 24 of the sleeve 22 is moved through this distance on operation of the slide 28.

In the locking position (see FIG. 1) the slide 28 has the function of a spacer or distance piece that keeps the component 12, that is to be fixed in position, at a given distance from the panel 14. The slide 28 is supported in this position by one shoulder 36 on the panel 14 and its other shoulder 38 on the component 12. The sleeve 22 sticking out of the panel 14 is bridged over in this respect, this ruling out any chance of the bush being forced inwards without this being desired. It is best to have a further support point in addition to the shoulder 36, such further point being to the other side of the pin 16 in the form of the bent part 37 of the slide 28. A slide 28 with this form is best made as one piece of stamped metal strip. The design is such that the cam slope 32 causing vertical motion of the sleeve 22 is on the lower side of the slide 28 with the right form.

Figure 4:
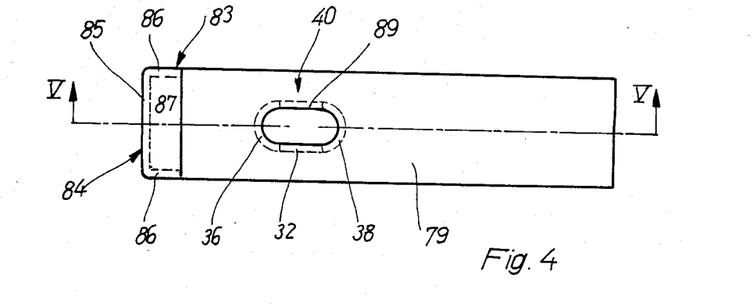
FIG. 4 is a top view of an alternative embodiment of a slide which is part of the locking system.
Figure 5:
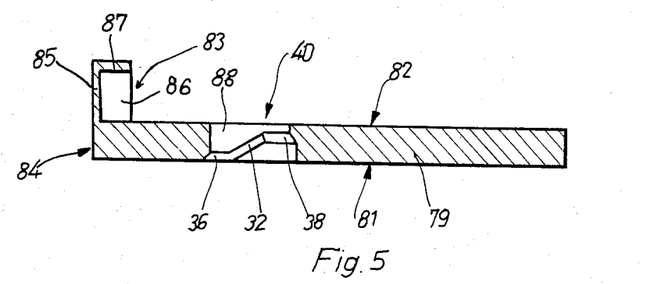
FIG. 5 is a side view of the slide as seen in a section taken on the line V—V of FIG. 4.
Figure 6:
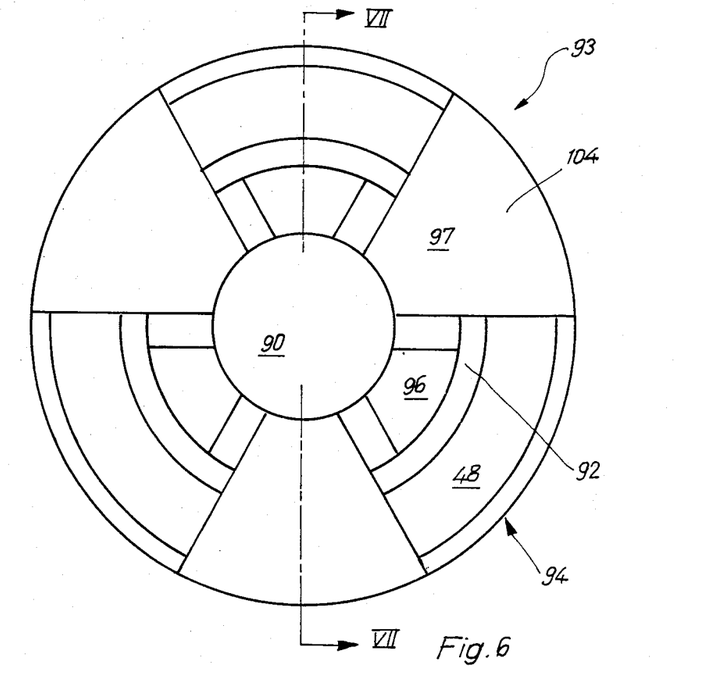
FIG. 6 is an end-on view of an alternative embodiment of a core part of the bush of the connector looking in the direction of the arrow VI of FIG. 7.

A further possible form of the slide 28 will be seen in the FIGS. 4 and 5, in the case of which parts thereof having the same function as in the slide of FIGS. 1 to 3 are given the same part numbers. The slide 28 has a rectangular body 79, that has a slot 40 in it. Because there is this slot 40 the slide 28 may be placed onto the pin 16 and the moved backwards and forwards in the direction of the slot. When the slide 28 is in its position locking a component 12 in place on the panel 14, the lower side of the main body 79 is resting against the panel 14. On the top of the base body 79 on the other hand there is a pocket 83 used to take up a cushion (not illustrated) forming a stop for the slide 28 when it is pushed up against the side of a component 12. As may be more specially seen from FIG. 5, the pocket 83 is formed in a rest at a right angle to the end 84 of the slide 28. The pocket has a back wall 85, two sides walls 86 and a top wall 87, that are at a right angle to each other, walling in said pocket. In this pocket or hollow the cushion, that may be made of a rubber-like material such as rubber itself of polyurethane, is placed and kept in position by being made somewhat oversize. If necessary the cushion may furthermore be kept in place by glue in the pocket 83. Its function as a stop is to make certain that the slide goes into a certain, regular starting position every time the slide is used and is in the locking position when the pin 16 is pushed into the panel.

In its middle part 88 the slot 40 takes the form of an opening running all the way through the slide 28 so that the pin 16 may be run through the slide. This part 88 is for its part of such a size that the pin 16 but not the collar 24 on the sleeve 22 is able to be pushed through it. In the lower face 81, next to the middle part 88 of the slot 40, there is a cutout so that lower part of the slot 40 is wider. This cutout is limited at the top thereof by a ledge taking the form of a guideway for the collar 24 on the sleeve 22 having two flat shoulders 36 and 38 and a shaped part 32 or cam slope running therebetween. The shoulders 36 and 38 are machined at different levels at the ends of the slot 40. The two shoulders 36 and 38 are joined together by the shaped face 32, that is at a slope in relation to the pin 16. As was the case with the first form of the slide 28, the shoulder 38 defines the position of the collar 24 of the sleeve 22 in the locking position of the fastening device or connector 10. For unlocking the pin 16 the slide 28 is moved along in relation to the pin 16, that is in the slot 40, the shaped part 32 running along past and on the collar 24, pushing it and the sleeve inwards so that in the position of unlocking, it will be at the shoulder 36.

In the working example of the slide 28 to be seen in FIGS. 4 and 5 it is not only the shoulders 36 and 38 but furthermore the shaped part or cam slope 32 (responsible for moving the sleeve 22 on the pin 16 into the desired position) that are within the slot 40, whose inner face is marked 88. This being so, it is possible for the slide to be made with flat outer faces end to end, this making operation of the slide simpler. As slide 28 of the sort noted may well be made of synthetic resin as a molding. The price of making such a part may then be lower than the price of making such a part as a metal stamping. In the case of a slide 28 made of resin it is furthermore possible for the shaped part 32 or cam slope to have the rounded form of a letter S placed on its side as a smooth curve between the shoulders 36 and 38. Using such a cam slope 32 one may be certain that the collar 24 is supported at a single line of contact all the way along the distance moved by the slide, this being better than having the collar supported at a single point on an inclined plane inasfar as the system is then more freely running.

A further important point in the present invention is the form of the bush 44, of which an account will now be given.

Figure 2:
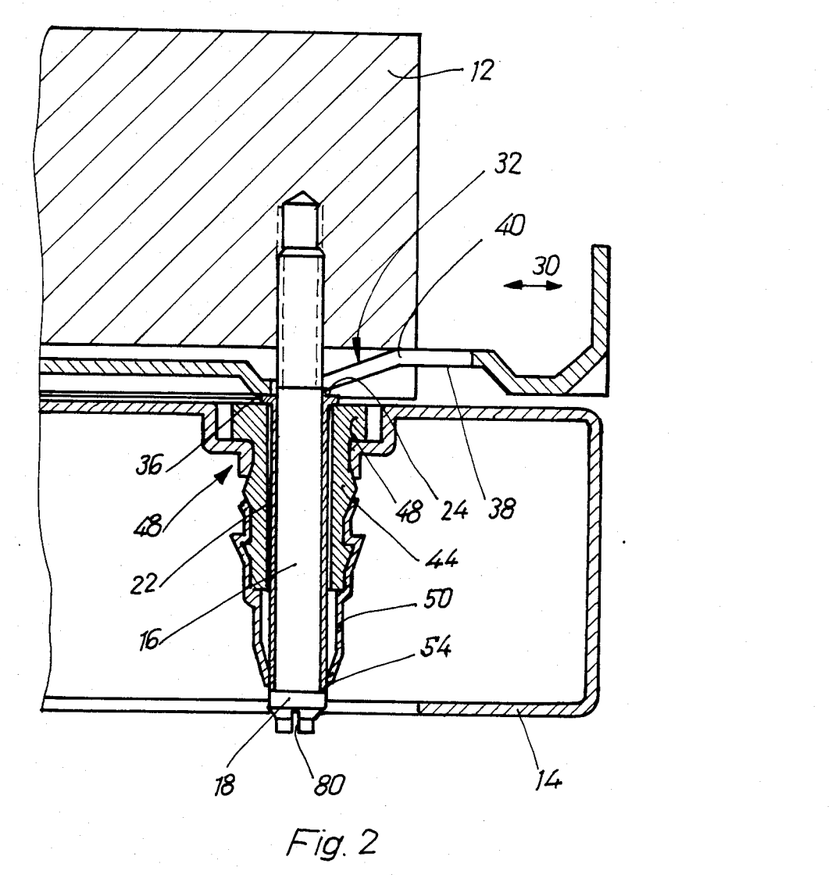
FIG. 2 is a view of the connector in keeping with FIG. 1 but in the unlocked condition.
Figure 3:
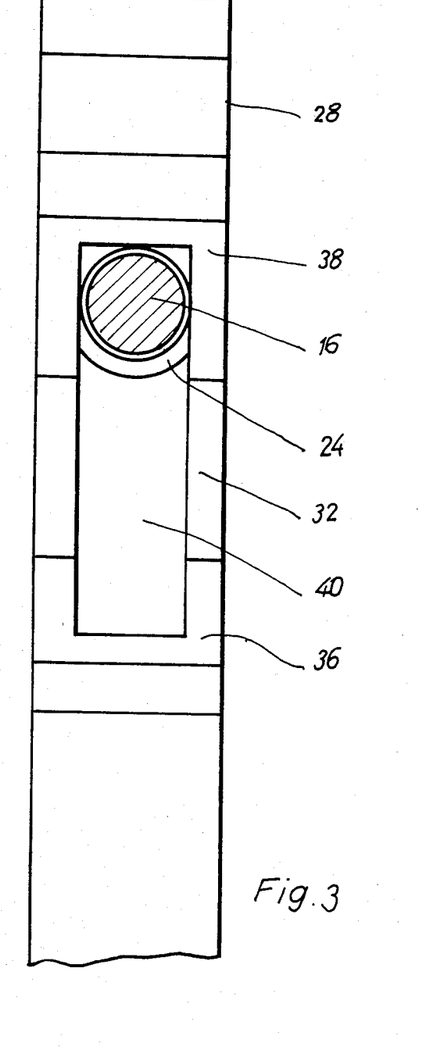
FIG. 3 is top view of the connector as seen in a section taken on the line III—III of FIG. 1.

Turning firstly to FIGS. 1 and 2 it will be seen that the bush 44 generally has the form of a housing with a hole running through it, whose one end may be snapped into its opening 100 in the panel 14. The other end of the housing has the gripping jaws 54 on it for locking the pin 16 in position in the bush after it has been slipped into the hole therein.

The locking in place of the bush 44 in the opening 100 of the panel 14 is best undertaken by use of a ring-like lip 48 running outer from the outer face of the bush 44 and forming the outer limit thereof. The ring-like lip 48 is made wider than the opening 100 so as to be somewhat like a radial flange and so that when the bush 44 is slipped into the opening 100 its edge 91 is in a position under the ring-like lip 48. The edge 91 is fixed in this position by a bead 92, that is formed on the outer face of the bush 44. The bead 92 is of such a size that on pushing the bush 44 home into position it may be moved through the opening 100 with elastic deformation. There is then expansion of the bead 92 again once it has got past the edge 91 so that the bush 44 is locked in the opening 100.

The jaws 54 at the other end of the bush 44 may be molded in one piece with the bush 44 (this form not being shown herein). Such a design, that comes within the general idea of the present invention, is however somewhat complex in view of the large number of functions to be effected by the bush 44. On the one hand the bush 44 is to be used for exactly guiding the pin 16 and the sleeve 22 thereon with the desired amount of friction. On the other hand the material of the bush is not to be overly soft and is to have a relatively high coefficient of friction. On the other hand the jaws 54 at the other end of the bush 44 are to have a high degree of elasticity while not being overly stiff. These desired properties may be produced on using a single-piece bush of resin or metal, although it is necessary to keep to very tight tolerances. The manufacture of such bushes is for this reason relatively complex.

In a form of the invention giving useful effects the bush 44 is for this reason made as two parts, that is to say a core 93 and a tongs or locking jaw 50 (see FIGS. 6 to 10) that may be slipped thereonto. The core 93 in this design has the ring-like lip 48 and the bead 92, which make it possible for the core 93 to be locked in the opening 100. Furthermore the core has a hole 90 for the pin 16 and the sleeve 22. The core 93 is best made of a soft elastic resin material with a high coefficient of friction as for example polyethylene. The tongs 50, with its end parts designed as the jaws 54, on the other hand is made of a metal or of a hard, stiff resin such as polyamide. It is best made with such a form that it is locked to the back side of the panel 14 and/or is frictionally joined to the core 93. To this end the core 93 may have a locking tooth on its outer face, which is received in a tooth-like pocket on the inner side of the tongs 50. On pushing the tongs 50 onto the core the teeth will then be joined together with a keying or locking effect forming a connection that may not be undone by a force acting in the axial direction.

In the working example of the invention of FIGS. 6 to 10 there is a locking and friction contact effect between the core 93 and the tongs 50 all the way round the interface between these parts. The core 93 has for this purpose a cylindrical part 94 (FIG. 6) molded onto the ring-like lip and the tongs 50 has an unbroken cylindrical collar 95 (see FIG. 8). The collar 95 has an inner diameter a little smaller than the outer diameter of the cylindrical part 94 and may be pushed onto the cylindrical part 94 because it may be stretched elastically so that it is seated on the part 94 while pressing inwardly thereagainst with a strong radial force.

In this way it is possible to make a strong connection between the core 93 and the tongs 50 which will only give trouble when the bush has to be pulled out of the panel 14 again, something that may be necessary for example when the elasticity of the jaws has gone down to a low level after long use, or wear has taken place on other parts of the fastening device 10. For such a change to be possible it is best to make use of a different design of the core 93 and of the tongs 50 that will be seen in FIGS. 6 to 10.

Figure 7:
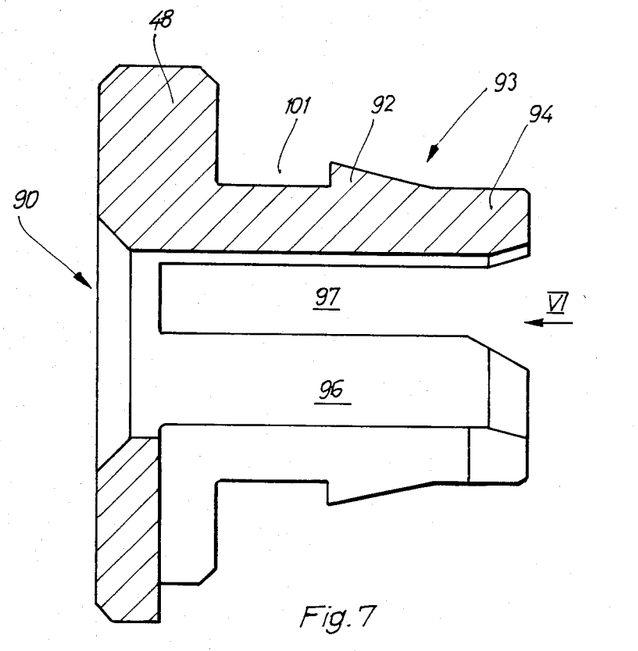
FIG. 7 is a side sectional view of the bush of FIG. 6 taken on the line VII—VII of FIG. 6.

Turning firstly to FIG. 7 it will be seen that the core 93 has a ring-like lip 48 as a flange at one end. On the other hand the cylindrical part molded thereonto is cut up into three evenly spaced axial segments 96, between which there are axial spaces 97 running partly round the ring-like lip 48. The axial segments 96 and the spaces 97 are placed one after the other round the structure with a spacing of 120 deg. between one segment and the next. The tongs 50 have matching molded teeth 98 for fitting into the axial spaces 97, the teeth 98 forming sort of tails on the collar 95 (see FIG. 8). The tongs 50 together with the collar 95 is now pushed onto the core 93 in such a way that the teeth 98 go into the axial spaces 97 so that they are filled up. The bush 44 made up of the core 93 and the tongs 50 will then be in the form of a complete cylindrical housing free of openings in its outer face.

Because of this axial division of the core 93 and of the tongs 50 in the length direction it is possible for these two parts to be fixed in place in the opening 100 in the panel 14. This is effected by use of the ring-like lip 48 and a bead 92 on the core 93, the bead 92 being molded in the form of the invention shown here as a part of the segments that gets wider conically towards the ring-like lip 96. This coned form makes it simpler for the core 93 to be put in the opening 100 of the panel 14, the edge 91 of the opening 100 then being moved, when this is done, along in relation to the bead which is bent more and more until it is taken up in a step 101 between the ring-like lip 48 and the bead 92 and locked in place here. Such a locking system for the tongs 50 is formed by the collar 95 and the teeth 98 molded thereon. The teeth 98 come up against the collar 95 with the forming of a radial step 102 on the tongs 50 and each become wider at the outer end in the form of a toe 99 stretching radially outwards, this toe 99 forming the limit of the step 102 on the collar 95. On putting the core 93 and the tongs 50 together the toes 99 are taken up in pockets 104, machined past and in line with the axial spaces 97 of the ring-like lip 48 of the core 93. The toes 99 may in this respect be moved so far into the pockets 104 that the step 102 of the tongs 50 is in line with the step 101 in the core 93. The two steps 101 and 102 in this respect take the form of a ring-like cut in the outer face of the assembled bush. The edge 91 of the opening 100 in the panel 14 becomes locked into this cut with a locking effect, the core 93 and tongs 50 however being locked separately from each other. The useful effects of this system will become clear more specially when the compound, assembled bush 44 is to be taken out of its opening 100 in the panel again. As noted earlier, the tongs 50 is best made of a hard, stiff synthetic resin material with a high resistance to compression and tension forces, as for example a polyamide, whereas on the other hand the core 93 is made of an elastic resin material with good wear properties, as for example polyethylene. A bush 44 designed on these lines keeps its form well when keyed in position in the panel 14, the core 93 being kept in position by its segments 96 in the opening 100. On the other hand however it may be taken out of the opening 100 simply by pulling, this being made possible by the elastic nature of the core 93. After pulling out the core 93 the tongs 50 may be relatively simply taken out by pressing back the teeth 98 from the opening 100.

Figure 8:
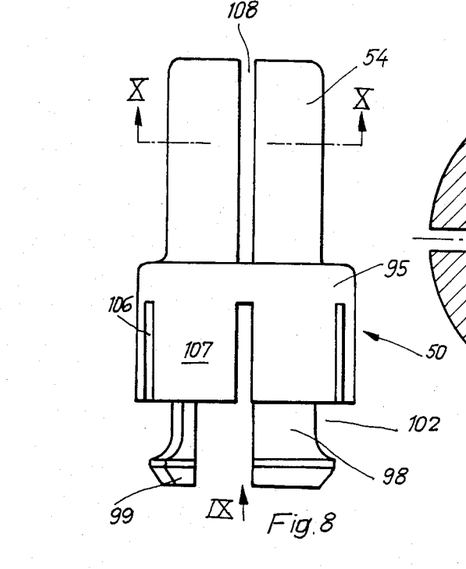
FIG. 8 is a side view of an alternative embodiment of a tongs part of the bush of the connector.
Figure 9:
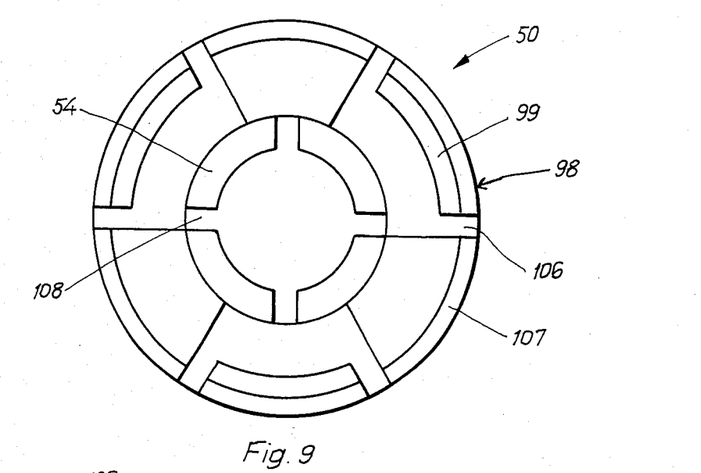
FIG. 9 is an end-on view of the tongs part looking in the direction IX of FIG. 8.
Figure 10:
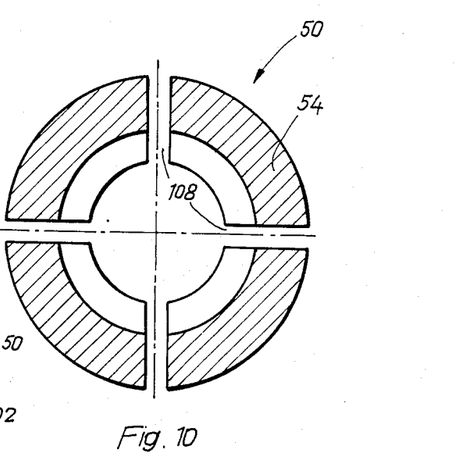
FIG. 10 is a section taken through the tongs on the line X—X of FIG. 8.

As part of a further useful development of the tongs to be seen in FIG. 8 the collar 95 therein is cut up in separate segments 107 by axial cutouts 106. This design makes it simpler for the core to be put in the opening 100. Furthermore a preferred system will be seen in FIG. 10 using four gripping jaws 54 as part of the tongs 50, each such jaw being in the form of an arc of about 90 deg with axial spaces therebetween with a fourfold symmetry.

Lastly an account will be given of some further developments of the fastening device in keeping with the invention. As one example the end, having the collar 18, of the pin 16 may have a driving groove 80 running spirally and radially or a screw head designed for use with a tool. The two shoulders 36 and 38 of the slide 28 are best at a right angle to the pin 16 and the sleeve 22 so as to make certain that the slide is kept firmly in its end positions. The slide 28 is kept in place between the component 12 and the collar 24 on the sleeve 22 in the unlocked condition of the connection or fastening device. If desired it is possible to have a single slide 28 with more than one slot 40 so that a number of pins 16 may be put through the slots and so plural sleeves 22 can be acted upon by cam slopes 32 on the slide 28 for unlocking the sleeves at one and the same time. It is lastly to be noted that the jaws 54 only take effect radially on the sleeve 22 and the collar 18 in the unlocked condition of the device 10. The radial force of the jaws 54 may readily be overcome on pulling the pin 16 together with the sleeve out of the opening.

The embodiments of the invention in which an exclusive property or privilege is claimed are defined as follows:

1. A connecting device for releasably connecting a first member to a second member, comprising: a bush adapted to be fixedly secured in an opening in the first member, said bush having a central opening therethrough, having at an end nearest the second member a core portion, and having at its opposite end a further portion which has a locking jaw; a pin which is adapted to be secured to the second member, which can be axially inserted in a first direction into said opening through said bush, and which has means defining an axially facing shoulder thereon which said locking jaw can engage for releasably locking said pin against axial movement relative to said bush in a second direction opposite said first direction; a sleeve which is axially slidably supported on said pin and which, when moved axially in said first direction relative to said pin, has a first end which moves said locking jaw outwardly so as to release said pin for movement in said second direction relative to said bush, wherein said sleeve frictionally engages said pin and said core portion of said bush, the friction between said sleeve and said bush being greater than the friction between said sleeve and said pin, and an operating element which cooperates with a second end of said sleeve which is remote from said first end and projects out of said bush, said operating element being supported for movement in a direction transversely of said pin and having means for causing axial movement of said sleeve in said first direction relative to said pin in response to movement of said operating element.

2. The connecting device according to claim 1, wherein said bush includes a core part and a locking jaw part which respectively include said core portion and said further portion of said bush, said bush having means for connecting said core part and locking jaw part to each other.

3. The connecting device according to claim 2, wherein said core part is a soft elastic plastic with a high surface friction, and wherein said locking jaw part is one of a metal and a stiff plastic.

4. The connecting device according to claim 3, wherein said core part of said bush is polyurethane and said locking jaw part is polyamide.

5. The connecting device according to claim 2, wherein said means for connecting said core part and said locking jaw part includes a locking tooth on one of said core and locking jaw parts and a tooth pocket on the other thereof which receives said locking tooth.

6. The connecting device according to claim 1, wherein said operating element is a slide member which cooperates with a radially outwardly projecting collar provided at said second end of said sleeve.

7. The connecting device according to claim 6, wherein said slide member has a surface which cooperates with said sleeve and is inclined with respect to said pin along at least part of its length, said surface being provided on a side of said slide member which faces said sleeve.

8. The connecting device according to claim 7, wherein said surface of said slide member has a slot therein, said pin being slidably received in said slot, said slot having a width which is greater than the diameter of said pin and less than the diameter of said collar of said sleeve.

9. The connecting device according to claim 1, wherein said pin has an end which is threaded and can be screwed into a threaded opening in the second member.

10. The connecting device according to claim 1, wherein said locking jaw part has a plurality of said locking jaws thereon at angularly spaced locations.

11. The connecting device according to claim 1, wherein said slide member is adapted to be positioned between and to slidably engage said first and second members.

12. The connecting device according to claim 1, wherein said pin has a head at one end thereof, said shoulder being provided on said head and being annular, and wherein said sleeve has an outside diameter which is at least as large as the outside diameter of said head of said pin.

13. The connecting device according to claim 1, wherein said pin has an annular recess adjacent said head.

14. The connecting device according to claim 1, wherein said bush includes a core part and a locking jaw part which are separate elements and which respectively include said core portion and said further portion of said bush; wherein said core part includes an annular lip and a plurality of angularly spaced segments extending axially away from said lip, each said segment having thereon at a location spaced axially from said lip an outwardly projecting bead; and wherein said locking jaw part includes an annular collar which snugly encircles said segments of said core part at an end thereof remote from said lip, a plurality of said locking jaws provided on said collar at angularly spaced locations and projecting axially away from said core part, and a plurality of angularly spaced teeth which project axially from said collar, which are each disposed in a space between a respective pair of said elements on said core part, and which each have a radially outwardly projecting toe in the region of said lip on said core part.

15. The connecting device according to claim 14, wherein said annular collar of said locking jaw part has a plurality of angularly spaced, axially extending cutouts therein.

* * * * *